(12) United States Patent
Cho (10) Patent No.: US 8,045,241 B2
(45) Date of Patent: Oct. 25, 2011

(54) SCANNER COLOR CORRECTION DEVICE AND CONTROL METHOD THEREOF

(75) Inventor: Min Ki Cho, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 625 days.

(21) Appl. No.: 12/117,117

(22) Filed: May 8, 2008

(65) Prior Publication Data

US 2009/0021806 A1    Jan. 22, 2009

(30) Foreign Application Priority Data

Jul. 16, 2007    (KR) ........................ 10-2007-0071308

(51) Int. Cl.
*G03F 3/08* (2006.01)

(52) U.S. Cl. ........ 358/518; 358/520; 358/523; 345/590; 382/167

(58) Field of Classification Search .................. 358/504, 358/515, 518, 523, 1.9, 520; 345/590; 382/162, 382/167
See application file for complete search history.

(56) References Cited

U.S. PATENT DOCUMENTS

| | | | | |
|---|---|---|---|---|
| 5,185,661 A * | 2/1993 | Ng | ................................. | 358/505 |
| 5,704,026 A * | 12/1997 | Wan | ............................... | 345/590 |
| 6,323,969 B1 * | 11/2001 | Shimizu et al. | ............... | 358/523 |
| 6,340,975 B2 * | 1/2002 | Marsden et al. | ............... | 345/590 |
| 6,719,392 B2 * | 4/2004 | Qiao | ................................. | 347/15 |
| 7,123,380 B2 * | 10/2006 | Van de Capelle | ............... | 358/1.9 |
| 7,239,422 B2 * | 7/2007 | Braun et al. | ..................... | 358/1.9 |
| 2003/0002061 A1 * | 1/2003 | Van de Capelle | ............. | 358/1.9 |
| 2004/0109180 A1 * | 6/2004 | Braun et al. | ..................... | 358/1.9 |
| 2005/0219585 A1 * | 10/2005 | Suzuki et al. | .................... | 358/1.9 |
| 2005/0248782 A1 * | 11/2005 | Tin | ................................. | 358/1.9 |
| 2007/0058183 A1 * | 3/2007 | Osaki et al. | ..................... | 358/1.9 |
| 2007/0058184 A1 * | 3/2007 | Kodama | .......................... | 358/1.9 |
| 2007/0081176 A1 * | 4/2007 | Newman et al. | ............... | 358/1.9 |
| 2009/0141041 A1 * | 6/2009 | Stauder et al. | .................. | 345/590 |
| 2010/0128055 A1 * | 5/2010 | Blonde et al. | .................. | 345/590 |
| 2010/0232694 A1 * | 9/2010 | Oicherman et al. | .......... | 382/167 |

FOREIGN PATENT DOCUMENTS

JP    2005-130537    5/2005

\* cited by examiner

*Primary Examiner* — Kimberly A Williams
(74) *Attorney, Agent, or Firm* — Stanzione & Kim, LLP (57) ABSTRACT

A color correction apparatus of a scanner and a method of controlling the same. The color correction apparatus changes data existing outside of the gamut boundary to the other data existing within a gamut boundary in order to correctly express a gamut, and correctly corrects the color of the scanner. The color correction apparatus includes a calculator to calculate CIE data corresponding to RGB data, and a correction unit to change the CIE data to new CIE data existing within a gamut boundary if it is determined that the CIE data exists outside of the gamut boundary.

20 Claims, 7 Drawing Sheets

SCANNER COLOR CORRECTION DEVICE AND CONTROL METHOD THEREOF

CROSS-REFERENCE TO RELATED APPLICATIONS

This application claims priority under 35 U.S.C 119(a) from Korean Patent Application No. 2007-0071308, filed on Jul. 16, 2007 in the Korean Intellectual Property Office, the disclosure of which is incorporated herein in its entirety by reference.

BACKGROUND OF THE INVENTION

1. Field of the Invention

The present general inventive concept relates to a color correction apparatus usable in a scanner and a method of controlling the same, and more particularly to a color correction apparatus usable in a scanner which can change data existing outside of a gamut boundary to correct data existing within a gamut boundary, and a method of controlling the same.

2. Description of the Related Art

Conventional color I/O (Input/Output) devices (e.g., cameras, scanners, monitors, and printers) have different color spaces according to their categories. For example, a conventional color printing device uses a CMY color space. The color CRT monitor or the computer graphic device uses an RGB color space. In order to reproduce colors of the above-mentioned devices having different color spaces, a variety of objective information (i.e., CIE color space for numerically expressing the colors) associated with the colors to be actually reproduced is typically used, for example, CIE-XYZ, CIE-Lab, and CIE-Luv.

The color I/O devices have different gamuts (i.e., different color ranges) in addition to the different color spaces. Due to a difference between the gamuts, although the same image is observed by different I/O devices, different images are created by the I/O devices. Therefore, there is needed a new method for correctly describing the gamut to implement the correct matching of the gamuts of the color I/O devices, and correcting input colors on the basis of the described gamut.

The color correction is indicative of the conversion of the color space of the input color signal. In more detail, the color correction converts a device-dependent color space (e.g., RGB and CMY) of the input color signal into a device-independent color space (e.g., CIE-XYZ and CIE-Lab). In order to convert the device-dependent color space into a device-independent color space, the scanner manufactures the lookup table for the color correction, so that it uses the lookup table to correct the color.

In order to manufacture the lookup table for the color correction of the scanner, a conventional method acquires RGB data of all the patches existing in the color chart by scanning the calibration color chart such as IT8.7/2, and performs the color-measurement of the calibration color chart using the color-measurement device, so that it acquires Lab data of all the patches contained in the color chart.

In this case, "L" is indicative of a brightness, a horizontal axis of the coordinates is denoted by "a", a vertical axis of the coordinates is denoted by "b", "a+" is a Red-direction, "a−" is a Green-direction, and a "b+" is a Yellow-direction, and "b−" is a Blue-direction. The center location (a=0 and b=0) corresponds to an achromatic color. If the color has the L value of 100, this color indicates a pure white color. If the color has the L value of 0, this color indicates a black color. As the "a" and "b" values of the color increase, the color becomes more distant from the center point, and the chroma value becomes higher, so that this color is considered to be a clear color.

Figure 1:
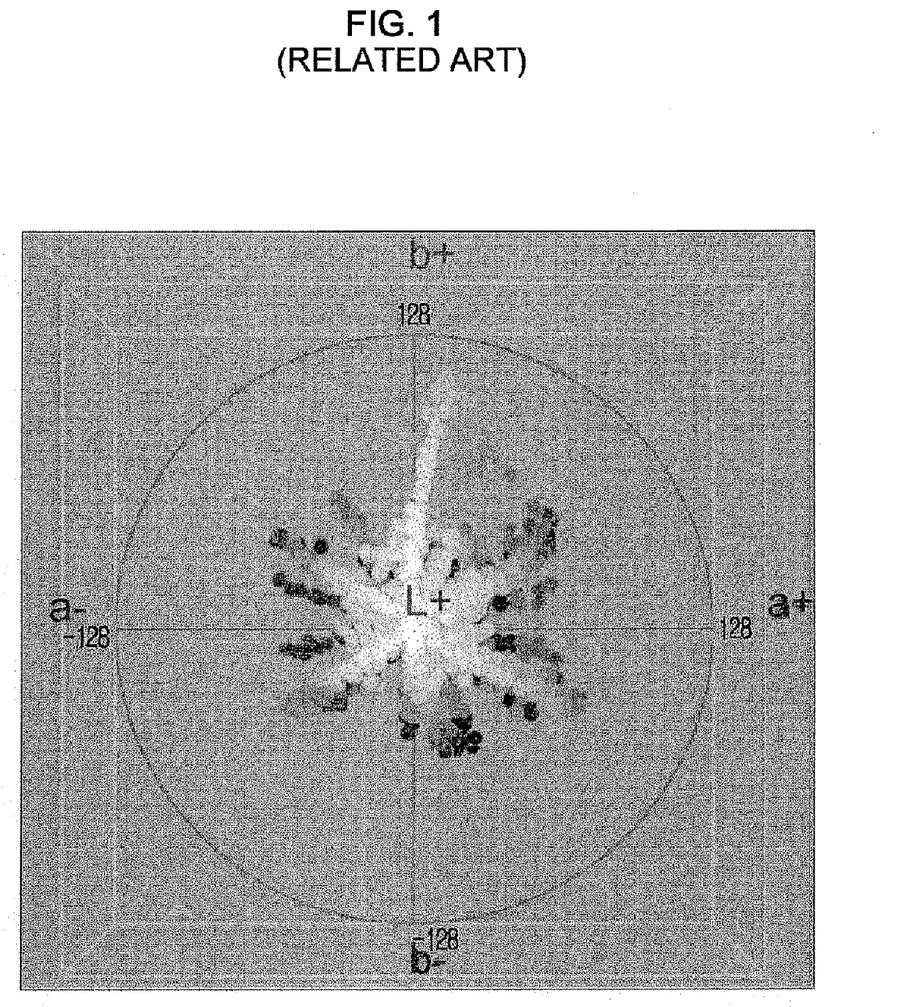
FIG. 1 illustrates Lab data formed by color measurement of a calibration color chart.
Figure 2:
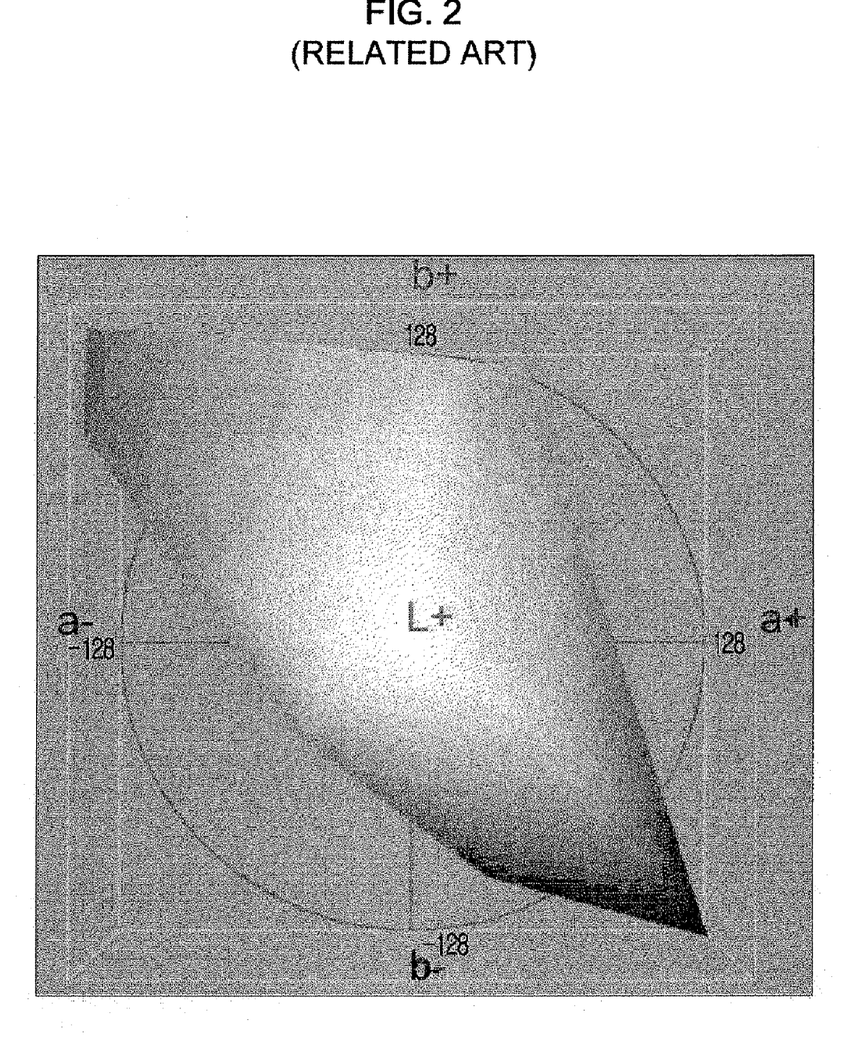
FIG. 2 illustrates a gamut detected by a conventional method.

As illustrated in FIG. 1, the Lab data of all the patches existing in the acquired color chart must exist in the range of $0 \leq L \leq 100$, $-128 \leq a \leq 128$, and $-128 \leq b \leq 128$.

Thereafter, a color characteristic equation is calculated using the acquired RGB and Lab data. The Lab data of all the RGB data is calculated on the basis of the calculated color characteristic equation, so that the lookup table for the color correction is manufactured.

However, the above-mentioned conventional method for manufacturing the lookup table for the color correction statistically analyzes the RGB data and the calculated Lab data, and calculates the color characteristic equation on the basis of the statistically-analyzed result, so that the gamut may unavoidably and undesirably fall out of the range of $0 \leq L \leq 100$, $-128 \leq a \leq 128$, and $-128 \leq b \leq 128$, due to an extrapolation error.

As a result, the above-mentioned conventional method is unable to correctly describe the gamut, so that it can effectively correct the color of the scanner.

SUMMARY OF THE INVENTION

The present general inventive concept provides a color correction apparatus usable in a scanner which can change data existing outside of a gamut boundary to correct data existing within a gamut boundary, and a method of controlling the same.

Additional aspects and/or utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a color correction apparatus usable in a scanner including a calculator to calculate CIE data corresponding to RGB data and a correction unit to change the CIE data to new CIE data existing within a gamut boundary if it is determined that the CIE data exists outside of the gamut boundary.

The apparatus may further include a decision unit to determine whether the CIE data exists outside of the gamut boundary.

The correction unit may change the CIE data to new CIE data of the shortest distance existing in the gamut boundary if the CIE data exists outside of the gamut boundary.

The apparatus may further include a scan input unit to receive RGB data formed by the scanning of a reference-color chart and a color-measurement input unit to receive CIE data formed by color measurement of the reference-color chart.

The apparatus may further include an estimation unit to estimate a color-correction calculation equation using the RGB data and the CIE data, wherein the calculation unit calculates CIE data corresponding to all of RGB data using the color-correction calculation equation.

The apparatus may further include a gamut boundary storage unit to store a gamut boundary predetermined by a gamut boundary description (GBD).

The foregoing and/or other aspects and utilities of the present general inventive concept may also be achieved by providing a color correction apparatus usable in a scanner including a decision unit to determine if a gamut volume created by an ICC profile exists outside of a color-measurement gamut volume created by CIE data formed by color measurement of a reference-color chart and a correction unit to change the gamut volume to a new gamut volume existing within the color-measurement gamut volume if the gamut volume exists outside of the color-measurement gamut volume.

The color-measurement gamut volume may be created by a gamut boundary description (GBD) manufactured by the CIE data.

The foregoing and/or other aspects and utilities of the present general inventive concept may also be achieved by providing a color correction apparatus including a scan input unit to receive RGB data formed by the scanning of a reference-color chart, and a color-measurement input unit to receive CIE data formed by color measurement of the reference-color chart, a calculation unit which calculates CIE data corresponding to all of RGB data using the RGB data and the CIE data, and a correction unit to change the CIE data to new CIE data existing within a pre-stored gamut boundary if it is determined that the CIE data exists outside of the gamut boundary.

The correction unit may change the CIE data to new CIE data of the shortest distance existing in the gamut boundary if the CIE data exists outside of the gamut boundary.

The foregoing and/or other aspects and utilities of the present general inventive concept may also be achieved by providing a method of controlling a color correction apparatus of a scanner, including receiving RGB data formed by the scanning of a reference-color chart, receiving CIE data formed by color measurement of the reference-color chart, estimating a color-correction calculation equation using the RGB data and the CIE data, calculating CIE data corresponding to all of the RGB data using the color-correction calculation equation, determining whether the CIE data exists outside of a pre-stored gamut boundary, and changing the CIE data to new CIE data existing within the gamut boundary if the CIE data exists outside of the gamut boundary.

The new CIE data may be located at a specific place having a minimum distance between the CIE data and the gamut boundary.

The foregoing and/or other aspects and utilities of the present general inventive concept may also be achieved by providing a method of controlling a color-correction apparatus of a scanner including creating a gamut volume using an ICC profile, creating a color-measurement gamut volume using CIE data formed by color measurement of a reference-color chart, determining whether the gamut volume exists outside of the color-measurement gamut volume, and if the gamut volume exists outside of the color-measurement gamut volume, changing the gamut volume to a new gamut volume existing within the color-measurement gamut volume.

The color-measurement gamut volume may be created by a gamut boundary description (GBD) manufactured by the CIE data.

The foregoing and/or other aspects and utilities of the present general inventive concept may also be achieved by providing a color correction apparatus, comprising a decision unit to compare a first color data with a predetermined range, and a correction unit to change the first color data into a second color data if the first color data is outside of the predetermined range.

The color correction apparatus may further comprise an estimation unit to estimate a color-correction calculation equation using RGB data and a first CIE data, wherein the first color data is the first CIE data and the predetermined range is a predetermined gamut boundary, such that the correction unit changes the first CIE data into a second CIE data if the estimated color-correction calculation equation determined that the first CIE data was outside a predetermined gamut boundary.

The color correction apparatus may further comprise a scan input unit to scan a reference-color chart to produce the RGB data, and a color-measurement input unit to receive the first CIE data by color-measuring the reference-color chart.

The color correction apparatus may further comprise a gamut boundary storage unit to store the predetermined gamut boundary.

The first color data may be a gamut volume created by an ICC profile and the predetermined range is a color-measurement gamut volume created by CIE data formed by color measurement of a reference-color chart, such that the correction unit changes the gamut volume to a new gamut volume existing within the color-measurement gamut volume if the gamut volume exists outside of the color-measurement gamut volume.

The foregoing and/or other aspects and utilities of the present general inventive concept may also be achieved by providing a computer readable recording medium having embodied thereon a computer program to execute a method, wherein the method comprises receiving RGB data formed by the scanning of a reference-color chart, receiving CIE data formed by color measurement of the reference-color chart, estimating a color-correction calculation equation using the RGB data and the CIE data, calculating CIE data corresponding to all of the RGB data using the color-correction calculation equation, determining whether the CIE data exists outside of a pre-stored gamut boundary, and changing the CIE data to new CIE data existing within the gamut boundary if the CIE data exists outside of the gamut boundary.

The foregoing and/or other aspects and utilities of the present general inventive concept may also be achieved by providing a computer readable recording medium having embodied thereon a computer program to execute a method, wherein the method comprises creating a gamut volume using an ICC profile, creating a color-measurement gamut volume using CIE data formed by color measurement of a reference-color chart, determining whether the gamut volume exists outside of the color-measurement gamut volume, and if the gamut volume exists outside of the color-measurement gamut volume, changing the gamut volume to a new gamut volume existing within the color-measurement gamut volume.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below to explain the present general inventive concept by referring to the figures.

Figure 3:
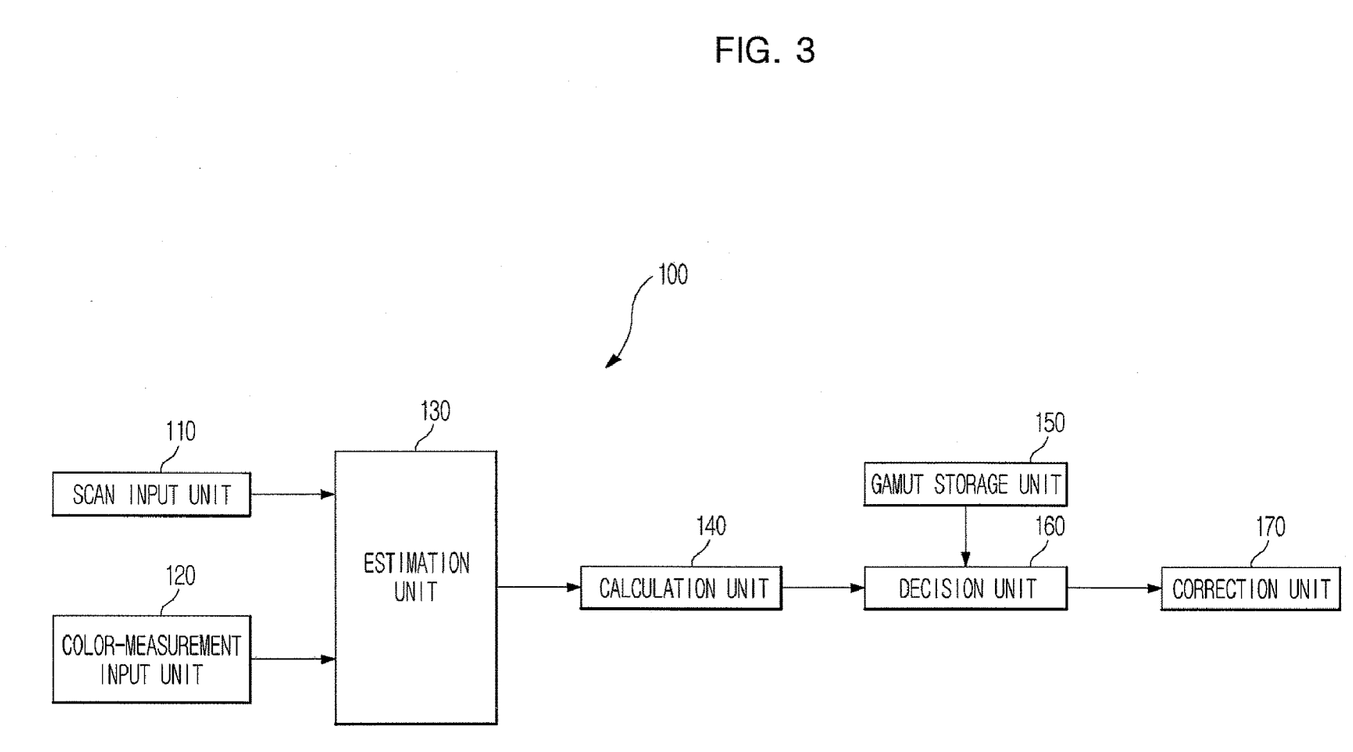
FIG. 3 is a block diagram illustrating a color correction apparatus of a scanner according to an embodiment of the present general inventive concept.

Referring to FIG. 3, the color correction apparatus 100 usable in a scanner according to an embodiment of the present general inventive concept includes a scan input unit 110, a color-measurement input unit 120, an estimation unit 130, a calculation unit 140, a gamut storage unit 150, a decision unit 160, and a correction unit 170.

The scan input unit 110 receives RGB data formed by a scanning of a reference-color chart.

The reference-color chart may be a calibration color chart such as ANSI IT8.7/1 or IT8.7/2, and may include about 288 patches. The ANSI IT8.7/1 standard defines an input test target that will allow any color input scanner to be calibrated with any film dye set used to create the target. It is intended to address the color transparency products that are generally used for input to the preparatory process for printing and publishing. This standard defines the layout and calorimetric values of a target that can be manufactured on any positive color transparency film and that is intended for use in the calibration of a photographic film/scanner combination. The ANSI IT8.7/2 standard defines an input test target that will allow any color input scanner to be calibrated with any film dye set used to create the target. It is intended to address the color photographic paper products that are generally used for input to the preparatory process for printing and publishing. It defines the layout and calorimetric values of the target that can be manufactured on any color photographic paper and is intended for use in the calibration of a photographic paper/scanner combination.

The color-measurement input unit 120 receives CIE data formed by the color measurement of the reference color chart.

In this case, there are a variety of CIE categories, for example, CIE-XYZ, CIE-Lab, and CIE-Lux. The CIE-XYZ is appropriate to objectively express a single color, and is inappropriate to express a color difference between at least two colors. In order to solve this problem of the CIE-XYZ, the CIE-Lab and the CIE-Lux are made in a three-dimensional color space. The CIE-Lux is mainly used when dealing with light-source colors of a display. The CIE-Lab has been mainly used for an object's color painted by a paint or dye, however, the CIE-Lab is the most frequently used in these days.

Accordingly, a color-measurement device to perform color-measurement of the reference-color chart has been devised to measure a physical measurement value and CIE data (e.g., a tri-stimulus value). The color-measurement device determines whether an object to be color-measured is a luminous material (e.g., a light source or a monitor) or a general surface color, or determines whether both the luminous material or the general surface color can be color-measured. According to the determined results, different color-measurement devices may be used. Each color-measurement device may include a light source to illuminate a sample, a device to divide the light into several short-waves according to wavelengths, and an optical element (e.g., a photo-detector) to detect the light signal divided into short-waves.

The estimation unit 130 estimates a color correction calculation equation using the RGB data and the CIE data. The color-correction calculation equation may be an NTSC RGB transform equation.

The estimation unit 130 experimentally searches to find the I/O correlation relationship. This method is called a polynomial regression method. The polynomial regression method numerically expresses the experimental data using a statistical method. The estimation unit 130 statistically searches to find the correlation between the RGB data used as input data and the CIE data used as output data, and estimates a color-correction calculation equation.

The calculation unit 140 calculates CIE data corresponding to all of RGB data using the color-correction calculation equation.

In this case, all of the RGB data are indicative of all kinds of data capable of being expressed in the form of RGB, and generally indicate data in the range of $0 \leq R \leq 255$, $0 \leq G \leq 255$, and $0 \leq B \leq 255$.

Therefore, the calculation unit 140 calculates CIE data corresponding to all the RGB data in the range of $0 \leq R \leq 255$, $0 \leq G \leq 255$, and $0 \leq B \leq 255$ using the color-correction calculation equation.

The CIE data corresponding to the RGB data will hereinafter be described in detail.

The CIE data is indicative of data existing in the CIE-Lab color space. Exemplary CIE data corresponding to the RGB data will hereinafter be described.

TABLE 1

| R | G | B | L | a | b |
|---|---|---|---|---|---|
| 0 | 0 | 0 | 24 | 38 | 72 |
| 0 | 0 | 1 | 31 | 97 | −184 |
| 0 | 1 | 0 | 65 | −138 | 16 |
| . | . | . | . | . | . |
| . | . | . | . | . | . |
| . | . | . | . | . | . |
| 255 | 255 | 255 | | | |

The Table 1 indicates calculation values of CIE data existing in a range of R=255, G=255, and B=255 at R=0, G=0, and B=0.

If the RGB data is denoted by R=0, G=0, and B=0, the calculation unit 140 calculates CIE data corresponding to R=0, G=0, and B=0, so that it acquires L=24, a=38, and b=72 as the calculation result, The calculation result of L=24, a=38, and b=72 is configured as a lookup table and is stored.

The calculation unit 140 is designed to repeatedly perform the above-mentioned operations until all data from the first CIE data corresponding to R=0, G=0, and B=0 to the last data corresponding to R=255, G=255, and B=255 is calculated.

The gamut storage unit 150 stores a gamut boundary predetermined by a gamut boundary description (GBD). This GBD can be manufactured by a variety of processes (e.g., the conversion and interpolation) of the color-measured CIE data, or may also be manufactured by a spherical coordinate system. Also, in addition to the above-mentioned method of using the interpolation and the spherical coordinate system, other methods may also be used to manufacture the GBD.

The decision unit 160 determines whether the CIE data exists in the gamut boundary using the GBD.

In other words, the decision unit 160 determines whether the CIE data exists in the gamut boundary. For example, provided that single selected CIE data is Lab-data, a gamut is $0 \leq L \leq 100$, $-128 \leq a \leq 128$, and $-128 \leq b \leq 128$, and the CIE data is L=34, a=45, and b=67, the decision unit 160 determines that the CIE data exists in the gamut boundary. Otherwise, if the CIE data is L=34, a=142, and b=135, the decision unit 160 determines that the CIE data exists outside of the gamut boundary.

The decision unit 160 determines whether the gamut volume created by an ICC (International Color Consortium) profile exists outside of the color-measurement gamut volume created by the CIE data formed by the color measurement of the reference-color chart.

In this case, the ICC profile is indicative of a data file indicating color expression characteristics of a corresponding device. In the present general inventive concept, the ICC profile indicates the color expression characteristics of the scanner. The color-measurement gamut volume is created by a gamut boundary description (GBD) manufactured by the CIE data.

After creating the range of a color (i.e., a gamut volume) capable of being expressed by the scanner using the ICC profile, the decision unit 160 numerically indicates the color range, so that it determines whether the gamut volume exists outside of the color-measurement gamut volume.

In more detail, the decision unit 160 maps the gamut volume to the color-measurement gamut volume using the ICC3D (Interactive Color Correction in 3 Dimensions), so that it can determine whether the gamut volume exists outside of the color-measurement gamut volume according to the mapping result from the decision unit 160.

The correction unit 170 changes the CIE data to new CIE data (i.e., C'I'E' data) according to the determined result.

Figure 4:
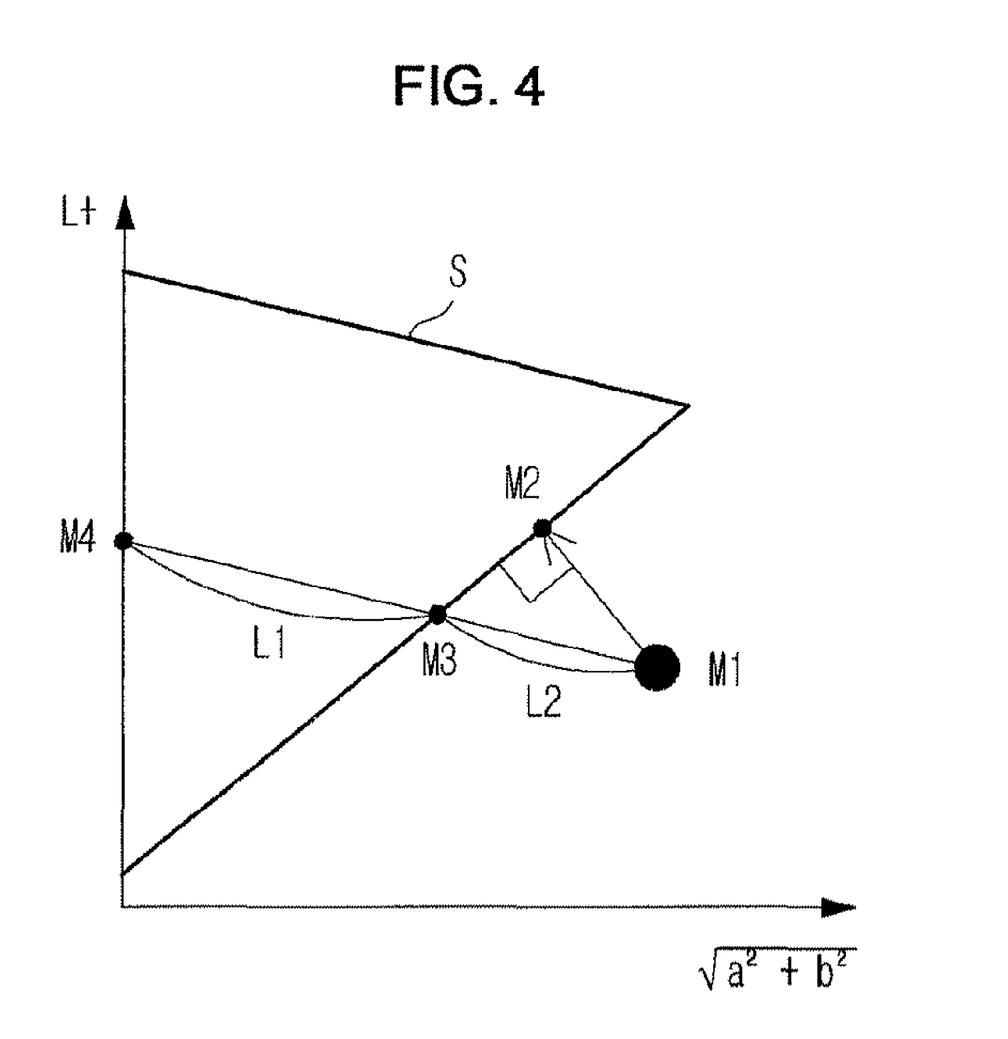
FIG. 4 is a conceptual diagram illustrating a method of changing CIE data to C'I'E' data using a correction unit of FIG. 3 according to an embodiment of the present general inventive concept.

In more detail, if the CIE data (M1) exists outside of the gamut boundary (S) as illustrated in FIG. 4, the correction unit 170 changes the CIE data (M1) to the C'I'E' data (M2 and M3) existing in the gamut boundary (S). In this case, the C'I'E' data (M2) has a minimum distance from the CIE data (M1) on the line reaching from the CIE data (M1) to the gamut boundary (S), so that the CIE data M1 is changed to the C'I'E' data (M2).

As described above, in order to change the CIE data to the C'I'E' data having a minimum distance from the CIE data, the C'I'E' data (M2) may be selected because it is located at a point at which a straight line from the CIE data (M1) to the gamut boundary (S) is changed to a perpendicular line.

In addition to the above-mentioned method, another method may also be used. This method selects the center point (M4) existing in the gamut boundary, calculates a first distance 1 (L1) from the point (M4) to the gamut boundary (S) and a second distance 2 (L2) from the point (M3) to the point (M1) including the CIE data, and determines whether the first distance (L1) is equal to or longer than the second distance (L2). If it is determined that the first distance (L1) is equal to or longer than the second distance (L2), the CIE data (M1) can also be changed to the other C'I'E' data (M3) existing in the gamut boundary (S).

Figure 5:
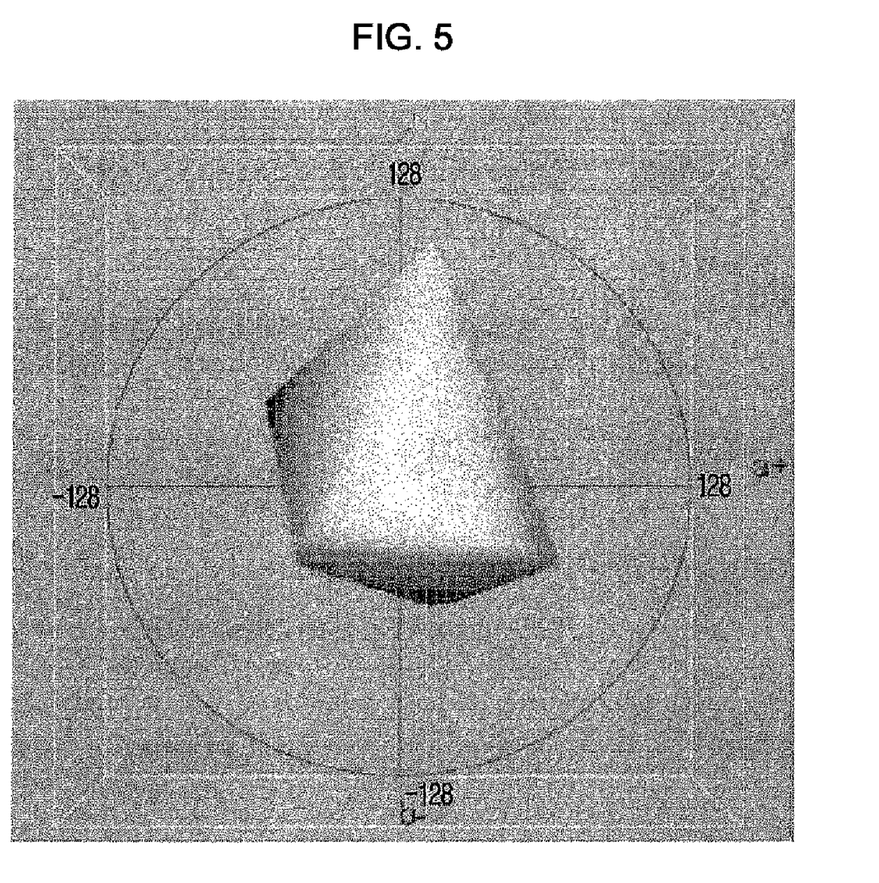
FIG. 5 illustrates a gamut corrected by the correction unit of FIG. 3 according to an embodiment of the present general inventive concept.

Therefore, the correction unit 170 acquires a corrected gamut in which the CIE data corresponding to all of RGB data does not escape from the range of $0 \leq L \leq 100$, $-128 \leq a \leq 128$, and $-128 \leq b \leq 128$.

If the gamut volume exists outside of the color-measurement gamut volume, the correction unit 170 changes the gamut volume to a new gamut volume existing within the color-measurement gamut volume.

As described above, in order to change the gamut volume to the new gamut volume existing within the color-measurement gamut volume, the correction unit 170 maps the gamut volume to the color-measurement gamut volume using the numerically-expressed color-measurement gamut volume. Also, the correction unit 170 allows several points constituting the gamut volume to be mapped within the color-measurement gamut volume, so that a new gamut volume can be made. In this case, it is preferable that the gamut volume may be changed to a new gamut volume located at a minimum distance existing in the color-measurement gamut volume.

The color correction process usable in the scanner will hereinafter be described.

Figure 6:
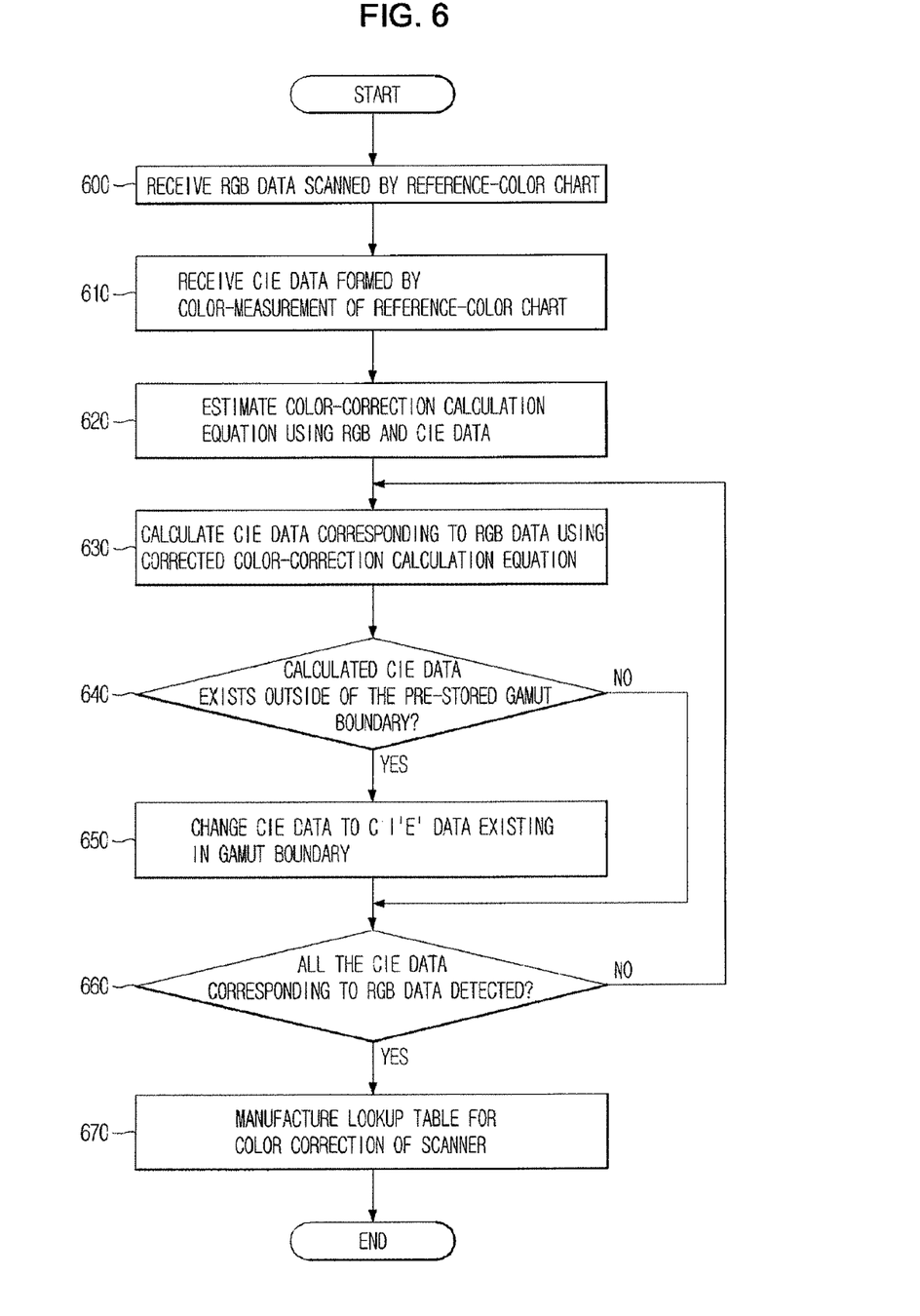
FIG. 6 is a flow chart illustrating a method of controlling a color correction apparatus of a scanner according to an embodiment of the present general inventive concept.

FIG. 6 is a flow chart illustrating a method of controlling a color correction apparatus of a scanner according to an embodiment of the present general inventive concept. Referring to FIG. 6, the scanner 110 receives the RGB data formed by the scanning of the reference-color chart at operation 600.

The color-measurement input unit 120 receives CIE data formed by color measurement of the reference-color chart at operation 610.

The estimation unit 130 estimates the color-correction calculation equation using the RGB and CIE data at operation 620. The calculation unit 140 calculates CIE data corresponding to all of RGB data using the color-correction calculation equation at operation 630.

After calculating the CIE data as described above, the decision unit 160 determines whether the calculated CIE data exists within a pre-stored gamut boundary at operation 640. If it is determined that the CIE data exists outside of the gamut boundary, the correction unit 170 changes the CIE data to the C'I'E' data existing within the gamut boundary at operation 650.

In more detail, the C'I'E' data may be located at a specific point having a minimum distance between the CIE data and the gamut boundary.

In contrast, if the CIE data exists within the pre-stored gamut boundary at operation 640, the decision unit 160 determines that all of the CIE data corresponding to the RGB data is detected at operation 660. If all of the CIE data corresponding to the RGN data has been detected, the decision unit 160 manufactures a lookup table corresponding to the color correction of the scanner using the CIE data corresponding to all of RGB data at operation 670.

Thereafter, upon receiving the RGB data corresponding to the color correction of the scanner, the scanner converts the input RGB data into CIE data using the lookup table corresponding to the aforementioned color correction, so that it performs the color correction.

Figure 7:
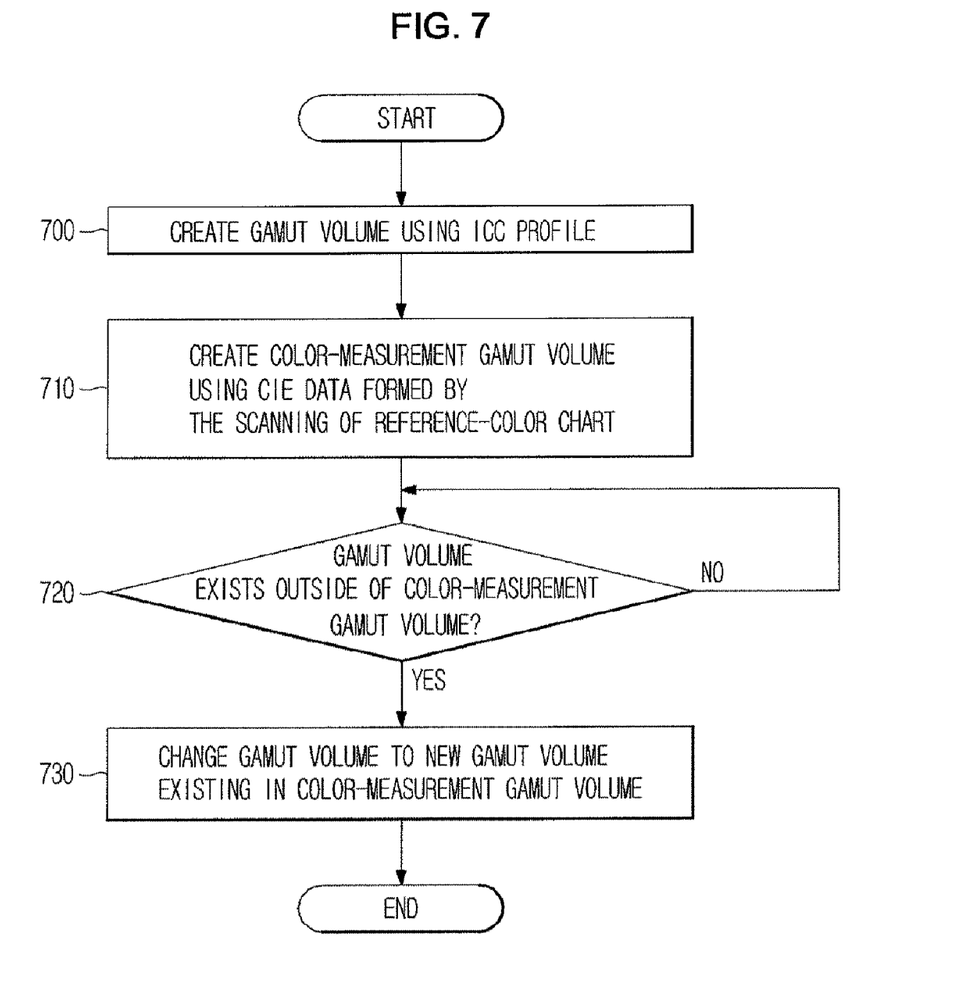
FIG. 7 is a flow chart illustrating a method of controlling a color correction apparatus of a scanner according to another embodiment of the present general inventive concept.

FIG. 7 is a flow chart illustrating a method of controlling a color correction apparatus of a scanner according to another embodiment of the present general inventive concept.

Referring to FIG. 7, the color correction apparatus creates a gamut volume using the ICC profile at operation 700.

The color correction apparatus creates a color-measurement gamut volume using the CIE data formed by the color-measurement of the reference-color chart at operation 710.

In more detail, the color-measurement gamut volume is created by the GBD manufactured by the CIE data.

The color correction apparatus determines whether the gamut volume exists outside of the color-measurement gamut volume at operation 720. If the gamut volume exists outside of the color-measurement gamut volume at operation 720, the color correction apparatus changes the gamut volume to a new gamut volume existing within the color-measurement gamut volume at operation 730.

In other words, the gamut volume is changed to a new gamut volume having a minimum distance existing in the color-measurement gamut volume.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As is apparent from the above description, a color correction apparatus usable in a scanner and a method of controlling the same according to an embodiment of the present general inventive concept can change CIE data existing outside of a gamut boundary to correct data existing within the gamut boundary, in order to prevent a gamut from escaping from a gamut setup range caused by an extrapolation error.

Since the color correction apparatus can correctly express the gamut, it can correct the color to be used in the scanner, so that it can increase an image quality of a copied image in the case of the copied-color matching process.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A color correction apparatus usable in a scanner, comprising:
    a calculator to calculate CIE data corresponding to RGB data;
    an estimation unit to estimate a color-correction calculation equation using the RGB data and the CIE data; and
    a correction unit to change the CIE data to new CIE data existing within a gamut boundary if it is determined that the CIE data exists outside of the gamut boundary,
    wherein the calculator calculates CIE data corresponding to all of RGB data using the estimated color-correction calculation equation.

2. The apparatus according to claim 1, further comprising:
    a decision unit to determine whether the CIE data exists outside of the gamut boundary.

3. The apparatus according to claim 2, wherein the correction unit changes the CIE data to new CIE data of the shortest distance existing in the gamut boundary if the CIE data exists outside of the gamut boundary.

4. The apparatus according to claim 1, further comprising:
    a scan input unit to receive RGB data formed by the scanning of a reference-color chart; and
    a color-measurement input unit to receive CIE data formed by color measurement of the reference-color chart.

5. The apparatus according to claim 1, further comprising:
    a gamut boundary storage unit to store a gamut boundary predetermined by a gamut boundary description (GBD).

6. A color correction apparatus usable in a scanner, comprising:
    a decision unit to determine if a gamut volume created by an ICC profile exists outside of a color-measurement gamut volume created by CIE data formed by color measurement of a reference-color chart; and
    a correction unit to change the gamut volume to a new gamut volume existing within the color-measurement gamut volume if the gamut volume exists outside of the color-measurement gamut volume.

7. The apparatus according to claim 6, wherein the color-measurement gamut volume is created by a gamut boundary description (GBD) manufactured by the CIE data.

8. A color correction apparatus, comprising:
    a scan input unit to receive RGB data formed by the scanning of a reference-color chart; and
    a color-measurement input unit to receive CIE data formed by color measurement of the reference-color chart;
    an estimation unit to estimate a color-correction calculation equation using the RGB data and the CIE data;
    a calculation unit to calculate CIE data corresponding to all of RGB data using the RGB data and the CIE data; and
    a correction unit to change the CIE data to new CIE data existing within a pre-stored gamut boundary if it is determined that the CIE data exists outside of the gamut boundary,
    wherein the calculation unit calculates CIE data corresponding to all of RGB data using the estimated color-correction calculation equation.

9. The apparatus according to claim 8, wherein the correction unit changes the CIE data to new CIE data of the shortest distance existing in the gamut boundary if the CIE data exists outside of the gamut boundary.

10. The color correction apparatus according to claim 8, wherein the correction unit changes the CIE data to new CIE data, and calculates a center point existing on a boundary line of the gamut boundary that is non-adjacent to the CIE data, and further calculates a straight line from a center point of the non-adjacent gamut boundary to the CIE data, and determines whether a first distance from the center point to an adjacent boundary line of the gamut boundary is greater than or equal to a second distance from the adjacent boundary line to the CIE data, and if so, replaces the CIE data with new CIE data that exists on an intersection of the straight line and the adjacent boundary.

11. A method of controlling a color correction apparatus of a scanner, comprising:
    receiving RGB data by the scanner formed by the scanning of a reference-color chart;
    receiving CIE data by a color management device formed by color measurement of the reference-color chart;
    estimating, by an estimation unit, a color-correction calculation equation using the RGB data and the CIE data;
    calculating, by a calculating unit, CIE data corresponding to all of the RGB data using the color-correction calculation equation;
    determining in a decision unit whether the CIE data exists outside of a pre-stored gamut boundary; and
    changing the CIE data in a correction unit to new CIE data existing within the gamut boundary if the CIE data exists outside of the gamut boundary.

12. The method according to claim 11, wherein the new CIE data is located at a specific place having a minimum distance between the CIE data and the gamut boundary.

13. A method of controlling a color-correction apparatus of a scanner, the method comprising:
    creating a gamut volume using an ICC profile in a gamut storage unit;
    creating a color-measurement gamut volume in a calculating unit using CIE data formed by color measurement of a reference-color chart;

determining whether the gamut volume exists outside of the color-measurement gamut volume by a decision unit; and determining in a determining unit that if the gamut volume exists outside of the color-measurement gamut volume, changing, in a correction unit the gamut volume to a new gamut volume existing within the color-measurement gamut volume.

14. The method according to claim 13, wherein the color-measurement gamut volume is created by in the calculating unit a gamut boundary description (GBD) manufactured by the CIE data.

15. A color correction apparatus, comprising:
a decision unit to compare a first color data with a predetermined range;
an estimation unit to estimate a color-correction calculation equation using RGB data and a first CIE data; and
a correction unit to change the first color data into a second color data if the first color data is outside of the predetermined range,
wherein the first color data is the first CIE data and the predetermined range is a predetermined gamut boundary, such that the correction unit changes the first CIE data into a second CIE data if the estimated color-correction calculation equation determined that the first CIE data was outside a predetermined gamut boundary.

16. The color correction apparatus of claim 15, further comprising:
a scan input unit to scan a reference-color chart to produce the RGB data; and
a color-measurement input unit to receive the first CIE data by color-measuring the reference-color chart.

17. The color correction apparatus of claim 15, further comprising:
a gamut boundary storage unit to store the predetermined gamut boundary.

18. The color correction apparatus of claim 15, wherein the first color data is a gamut volume created by an ICC profile and the predetermined range is a color-measurement gamut volume created by CIE data formed by color measurement of a reference-color chart, such that the correction unit changes the gamut volume to a new gamut volume existing within the color-measurement gamut volume if the gamut volume exists outside of the color-measurement gamut volume.

19. A non-transitory computer readable recording medium having embodied thereon a computer program to execute a method, wherein the method comprises:
receiving RGB data formed by the scanning of a reference-color chart;
receiving CIE data formed by color measurement of the reference-color chart;
estimating a color-correction calculation equation using the RGB data and the CIE data;
calculating CIE data corresponding to all of the RGB data using the color-correction calculation equation;
determining whether the CIE data exists outside of a pre-stored gamut boundary; and
changing the CIE data to new CIE data existing within the gamut boundary if the CIE data exists outside of the gamut boundary.

20. A non-transitory computer readable recording medium having embodied thereon a computer program to execute a method, wherein the method comprises:
creating a gamut volume using an ICC profile;
creating a color-measurement gamut volume using CIE data formed by color measurement of a reference-color chart;
determining whether the gamut volume exists outside of the color-measurement gamut volume; and
if the gamut volume exists outside of the color-measurement gamut volume, changing the gamut volume to a new gamut volume existing within the color-measurement gamut volume.

* * * * *